(12) United States Patent
Golovinsky et al.

(10) Patent No.: US 7,716,353 B2
(45) Date of Patent: May 11, 2010

(54) WEB SERVICES AVAILABILITY CACHE

(75) Inventors: Eugene Golovinsky, Houston, TX (US); Vincent Kowalski, Houston, TX (US)

(73) Assignee: BMC Software, Inc., Houston, TX (US)

( * ) Notice: Subject to any disclaimer, the term of this patent is extended or adjusted under 35 U.S.C. 154(b) by 991 days.

(21) Appl. No.: 11/306,290

(22) Filed: Dec. 21, 2005

(65) Prior Publication Data

US 2007/0143496 A1 Jun. 21, 2007

(51) Int. Cl.
G06F 15/173 (2006.01)
(52) U.S. Cl. .................................. 709/229; 709/238
(58) Field of Classification Search ................. 709/229, 709/227
See application file for complete search history.

(56) References Cited

U.S. PATENT DOCUMENTS

| | | | | |
|---|---|---|---|---|
| 6,442,547 | B1 * | 8/2002 | Bowman-Amuah | 707/10 |
| 7,380,003 | B1 * | 5/2008 | Guo et al. | 709/226 |
| 2002/0120697 | A1 * | 8/2002 | Generous et al. | 709/206 |
| 2005/0033803 | A1 * | 2/2005 | Vleet et al. | 709/203 |

OTHER PUBLICATIONS

Douglas B. Terry and Venugopalan Ramasubramanian, Caching XML Web Services for Mobility, Mar. 2003, vol. 1, Whole Document.*

Terry, Douglas B. et al., "Caching XML Web Services for Mobility," Building Web services, vol. 1, No. 1, Mar. 2003, obtained from http://www.acmqueue.org/, 10-pages.

Takase, Toshiro et al., "A Web Services Cache Architecture Based on XML Canonicalization," obtained from http://www2002.org/CDROM/poster/126/, 7-pgs.

* cited by examiner

Primary Examiner—Quang N. Nguyen
Assistant Examiner—Andrew Woo
(74) Attorney, Agent, or Firm—Wong, Cabello, Lutsch, Rutherford & Brucculeri, LLP

(57) ABSTRACT

A Web Services availability cache is part of a computer system, such as an enterprise system of a business or organization. The availability cache is populated with information from Web Services communicatively connected to the computer system by a network connection. In one embodiment, the availability cache is populated based on each request handled by a server process associated with the availability cache. A server receives a request from a client having an application dependent upon information from the Web Service. The server sends the request to the Web Service and stores returned information in the availability cache. Also, the server sends the returned information to the client, which initiated to request. Once the cache is populated, the server handles subsequent requests for information from the client by using the Web Service if it is available or by using the availability cache if the Web Service is not available.

30 Claims, 6 Drawing Sheets

WEB SERVICES AVAILABILITY CACHE

FIELD OF THE PRESENT DISCLOSURE

The subject matter of the present disclosure relates to an availability cache for Web Services and associated systems and methods.

BACKGROUND OF THE PRESENT DISCLOSURE

Web Services provide various clients with information. Prior art cache systems address the issue of performance associated with Web Services. For example, a typical performance-oriented cache is used for situations where multiple clients make the same requests to a Web Service. As the same query is repeatedly made to the Web Service, the performance-oriented cache stores the result from such repeated queries. When the same query is then made again to the Web Service, the performance-oriented cache can quickly return the result without having to obtain the information from the Web Service all over again. In this way, the performance-oriented cache is intended to improve performance by decreasing the time and processing required to respond to the same queries to the Web Service.

In addition to the issue of performance, however, Web Services also have an issue with availability of information. For example, a client application may rely on information from a Web Service, but the Web Service is either down or unable to provide the required information. In some situations, the client application may fail or stop working altogether ("crash") if it does not receive the required information from the unavailable Web Service. More typically, the client application will experience an exception when the Web Service is unable to provide the required information.

In general, clients want to maximize their respective up time, and they do not want to be subject to the availability of a remote Web Service that may not have been developed by the client or is not operated by them. One way of handling the issue of availability of a Web Service involves using a monitoring device to determine if the Web Service is down or unavailable. Unfortunately, using such a monitoring device does not sufficiently address the issue of availability, because the client application is still not able to obtain the required information.

The subject matter of the present disclosure is directed to overcoming, or at least reducing the effects of, one or more of the problems set forth above.

SUMMARY OF THE PRESENT DISCLOSURE

A Web Services availability cache is disclosed. The availability cache is part of a computer system, such as an enterprise system of a business or an organization. The availability cache is populated with information from Web Services that are communicatively connected to the computer system by network connections. In one embodiment, the availability cache is populated based on each request handled by a server process associated with the availability cache. For example, the server process receives an initial request from a client having an application. The application is at least partially dependent upon information from the Web Service. In response, the server process calls the Web Service and receives the requested information from the Web Service. The server process then stores the received information in the availability cache and sends the received information to the client, which initiated the request.

Once the availability cache is populated in this manner, the server process handles subsequent requests for information from the client by using the Web Service if it is available or by using the availability cache if the Web Service is not available. For example, the server process receives a request for information from the client and routes the request to the Web Service. If the Web Service is down or unable to return the requested information, the server process determines that a fault condition has occurred in response to the request. Consequently, the server process obtains information related to the request from the availability cache and routes that information to the client for use by the application.

The foregoing summary is not intended to summarize each potential embodiment or every aspect of the present disclosure.

BRIEF DESCRIPTION OF THE DRAWINGS

The foregoing summary, preferred embodiments, and other aspects of subject matter of the present disclosure will be best understood with reference to a detailed description of specific embodiments, which follows, when read in conjunction with the accompanying drawings, in which.

Figure 1:
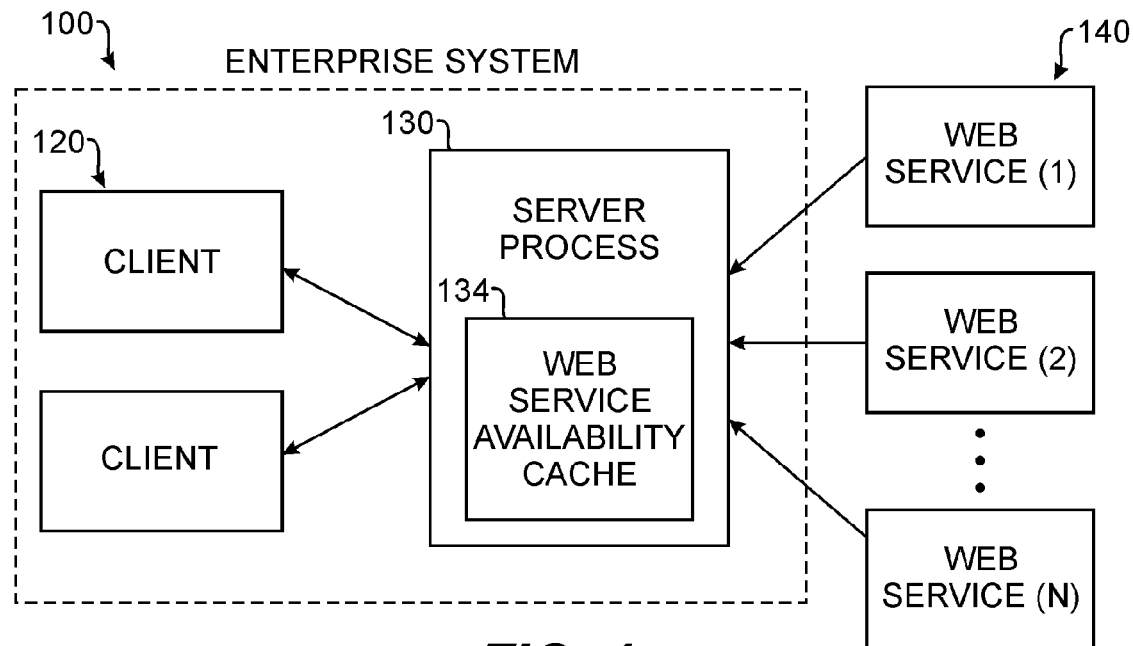
FIG. 1 illustrates a computer system relative to a plurality of Web Services.

While the disclosed Web Services availability cache is susceptible to various modifications and alternative forms, specific embodiments thereof have been shown by way of example in the drawings and are herein described in detail. The figures and written description are not intended to limit the scope of the inventive concepts in any manner. Rather, the figures and written description are provided to illustrate the inventive concepts to a person skilled in the art by reference to particular embodiments, as required by 35 U.S.C. § 112.

DETAILED DESCRIPTION

Referring to FIG. 1, a computer system 100 is schematically illustrated relative to a plurality of Web Services 140 according to certain teachings of the present disclosure. The computer system 100 has a plurality of clients 120 and a server process 130. During operation, the clients 120 have applications that are at least partially dependent upon information from one or more of the Web Services 140, and the server process 130 connects the clients 120 with the Web Services 140.

The Web Services 140 may not always be available or may not always be able to process a request for information. Because the clients 120 have applications that are at least partially dependent upon information from one or more Web Services 140, the server process 130 has a Web Services availability cache 134 to handle situations where requested information is not directly available from the Web Services 140. In one embodiment, the Web Services availability cache 134 is software deployed on the computer system 100 and is directed to storing information from the Web Services 140 to improve the availability of the information from the Web Services that the applications 120 rely on. If a network connection with the Web Service 140 fails or a request cannot be processed by one or more of the Web Services 140, the availability cache 134 provides the "best last" or most recently available information from a given Web Service 140 as a surrogate for information actually delivered by the Web Service 140. Consequently, the availability cache 134 offers a layer of availability to the clients 120 so that the clients 120 dependent on a given Web Service 140 can be prevented from failing or experiencing an exception.

For example, a client 120 makes a request for information from a Web Service 140 during operation. The request is handled by the server process 130. It is possible that the network connection between the server process 130 and the Web Service 140 is down, and the server process 130 experiences a fault condition when it calls the Web Service 140. If such a fault condition occurs, the server process 130 instead retrieves information from the availability cache 134 that is related to the initial request from the client 120, and the server process 130 returns the retrieved information to the client 120 via a network connection.

In this way, the Web Services availability cache 134 can address the dependency of the application of the client 120 on the Web Service 140 while the network connection between the computer system 100 and the Web Service 140 experiences a fault condition. By caching information, the availability cache 134 provides an alternative source of information related to the Web Services 140. By retrieving information related to an initial request when a fault condition occurs, the availability cache 134 provides the client 120 with the best-known or most recently available information from the Web Service 140 as of a given point in time. The availability of required information is improved because the likelihood of a given Web Service 140 and the availability cache 134 being down at the same time may be low.

In one embodiment, the Web Services 140 are remote servers independent from the computer system 100 and connected via the Internet or other type of network connection known in the art. Although the Web Services in FIG. 1 are given the same reference number 140, this is only done for convenience. It is understood that each Web Service 140 can be a different Web Service not associated with the others. In other words, the computer system 100 and Web Services 140 are configured for communication but do not share control or operation. In this context, examples of applications of the clients 120 include, but are not limited to, business reporting applications and Web-dependent business applications. Such applications of the clients 120 may depend on information from various types of Web Services 140, such as Internet Websites providing financial, weather, travel, or other information relevant to a business or organization.

In another embodiment, the computer system 100 is an enterprise system used to monitor a wide range of components and business processes of an organization's computer infrastructure. In this context, the Web Services 140 can have Enterprise Resource Planning (ERP) data in datastores, and the clients 120 can have enterprise applications responsible for monitoring and integrating components and business processes of the organization's computer infrastructure. For example, the applications of the clients 120 can be system administration applications that monitor key performance indicators and ERP data stored at remote servers of the enterprise computer system 100, as will be explained below with reference to an embodiment of FIG. 6.

As noted above, the present embodiment of FIG. 1 shows that the clients 120 and the server process 130 are part of a first computer system 100, and the Web Services 140 are provided by one or more second computer systems. In another embodiment, the client applications 120 are part of a first computer system, the Web Services 140 are provided by one or more second computer systems, and the server process 130 is provided by a third computer system.

Figure 2A:
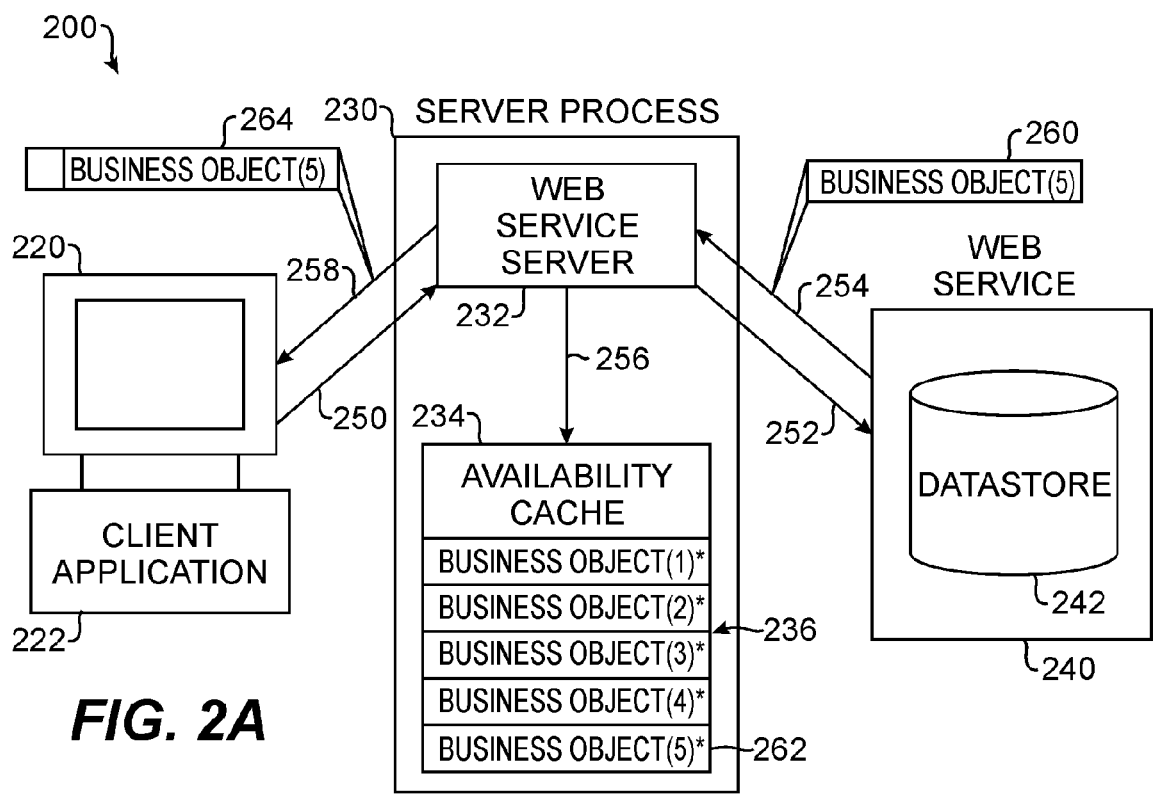
FIG. 2A illustrates an embodiment of a client, a server process, and a Web Service in a first mode of operation where a Web Services availability cache is populated.

Referring to FIG. 2A, portion of a computer system 200 having a client 220 and a server process 230 is illustrated in more detail. The client 220 has a client application 222. The server process 230 routes requests from the client application 222 of the client 220 to the Web Service 240 and returns responses from the Web Service 240 to the client 220. As illustrated in FIG. 2A, the client application 222, the server process 230, and the Web Service 240 are shown in a first or "normal" mode of operation. In this first mode, the client application 222 is capable of obtaining requested information from the Web Service 240 while an availability cache 234 associated with the server process 230 is concurrently populated with information. In this way, the availability cache 234 is a "shadow" store of Web Service information.

The client application 222 is at least partially dependent upon information or business-related objects from the Web Service 240. For example, the client application 222 can be a software application in the computer system 200 that relies on mission-critical information from the Web Service 240 in order to process or function during operation. In one implementation, the information relied upon by the client application 222 is in the form of discrete, business objects directly usable by the client application 222.

The Service process 230 includes a web Service server 232, which is associated with the availability cache 234. Although only one Web Service server 232 and availability cache 234 are shown, it is understood that the server process 230 can have a plurality of servers and more than one availability cache depending on a particular implementation. In addition, although only one Web Service 240 is shown, it is understood that the Server process 230 can be communicatively connected to a plurality of Web Services. The Web Service server 232 can be a typical server for a business or an organization. The availability cache 234 is preferably a lightweight relational database having normalized tables, but other databases and data structures can be used depending on the implementation. For example, the availability cache 234 can be a conventional relational database, a flat file, or a scalable data structure. In the present embodiment, the Web Service 240 is communicatively connectable to the Web Service server 232 via a network, such as the Internet, and the Web Service server 232 communicates requests to the Web Service 240 by sending messages or making calls. The Web server 232 can use Remote Procedure Calls (RPCs), which can be XML-based, or can use other synchronous or asynchronous methods known in the art. In FIG. 2A (as well as FIGS. 2B-2C and 4A-4B), the Web Service 240 is shown having a datastore 242 from which data is obtained. It will be appreciated that this is but one available option. In other options, the Web Service 240 can be connected to another Web Service (not shown) from which it obtains data, or the Web Service 240 can have an algorithm or some other process to calculate data.

In one example, the Web Service 240 is hosted by a financial institution that provides up-to-the-minute exchange rates for various currencies. This exchange rate information is used by the client application 222, which is a corporate expense report application for computer system 200, and the information from the Web Service 240 allows the client application 222 to make currency conversions. When communication between the server process 230 and the Web Service 240 experiences an interruption or fault of some kind, the client application 222 relying on information from the Web Service 240 will no longer operate properly when current information from the Web Service 240 is required. If the client 220 is not monitoring the availability of the Web Service 240, the client application 222 can continue to operate as long as the exchange rate function in the client application 222 is not invoked. When the exchange rate function is invoked, however, the client application 222 will experience an exception. Depending on the design of the client application 222, the entire workflow in the client application 222 may be aborted. In more favorable situations, partial results in the client application 222 may be saved locally, but the user will still need to come back to complete the expense report when the network connection to the Web Service 240 is back up and running.

To address the availability of information from the Web Service 240, the availability cache 234 stores information from the Web Service 240 based on the requests that the server process 230 handles. In the present embodiment, for example, the availability cache 234 is populated with information 236 as the information is retrieved from the Web Service 240 according to a technique 300 illustrated in FIG. 3A. In this technique 300, the client application requests information from the Web Service, and the request is routed to the server process (Block 302). In response, the server process routes the request to the Web Service (Block 304). The Web Service obtains the requested information and sends a response back to the server process (Block 306). When the response is received, the server process stores the information of the response in the availability cache so that the information will be available later if necessary (Block 308). In addition, the server process routes the information of the response to the client application, which can then use the information during operation (Block 310).

Figure 3A:
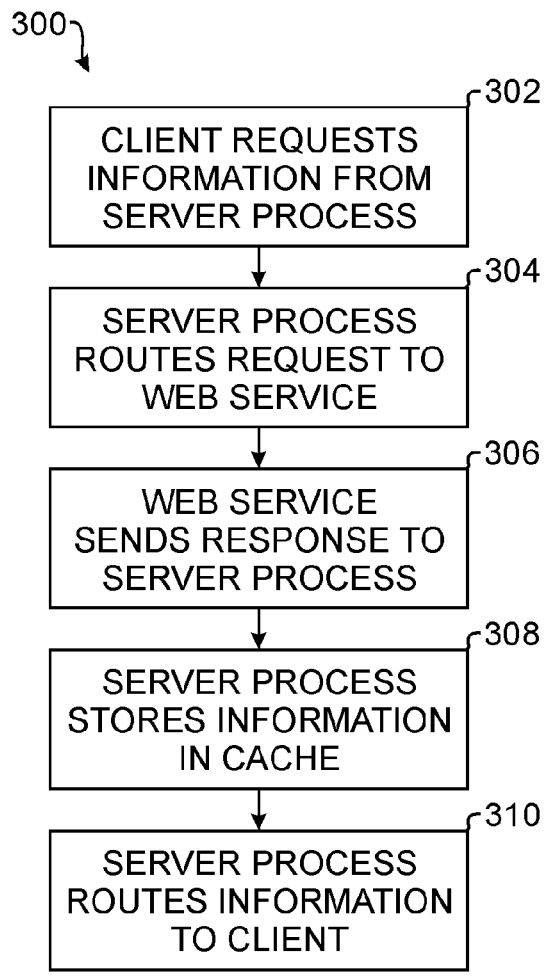
FIG. 3A is a flow chart illustrating a technique for handling a Web Service call and populating a Web Services availability cache.

Given the above overview of the technique 300 in FIG. 3A, we return to FIG. 2A to discuss the technique in additional detail. The client 220 makes a request for information by making a data retrieval operation 250 to the Web Service server 232 of the server process 230. The data retrieval operation 250 can generally be any operation that gets data and is not necessarily any specific protocol operation. In response to the invocation 250, the Web Service server 232 sends a message or makes a call 252 to the Web Service 240. The message or call can be a Remote Procedure Call (RPC), but other synchronous or asynchronous methods known in the art can be used. If the Web Service 240 is available, the Web Service 240 retrieves the requested information from its datastore 242 and sends a response 254 to the Web Service server 232. The Web Service server 232 makes a cache write operation 256 with the returned information of the response 260 to the availability cache 234, which stores the information in an entry 262 of the availability cache 234. The entry 262 may be entirely new and added to the availability cache 234 in circumstances where related information of the entry 262 has not been used previously to populate the cache 234. On the other hand, the entry 262 may replace already existing information in the availability cache 234 in circumstances where the information in the entry 262 represents an update or more recent information already stored in the cache 234. In addition to storing the returned information, the Web Service server 232 sends a response 258 having the information from the Web Service 240 to the client 220, and the client application 222 is able to uses the returned information during operation.

In the above-described technique for populating the availability cache 234, the cache 234 is loaded with information when triggered by requests. In this case, it is preferred that the client 220 use the server process 230 having the availability cache 234 as a proxy and sends the request to the server process 230 for forwarding to the Web Service 240. When the request of the original data retrieval operation 250 is made, the server process 230 is triggered to populate the availability cache 234 with information related to the request with new data from the Web Service 240 in the event that the Web Service 240 is available and can provide the response requested. The response 254 is returned to the cache 234, which appropriately populates the requisite portion of the cache 234 with the information, and is then sent on to the client 220 having the application 222 that made the request. In this way, the availability cache 234 is populated with each request handled by the server process 230.

With the availability cache 234 populated in the above manner, the availability cache 234 can be used when a fault condition occurs between the server process 230 and the Web Service 240. For example, the availability cache 234 can be used when the network connection between the Web Service server 232 and the Web Service 240 is down or interrupted or when the Web Service 240 is unable to process a request for any reason. In general a fault condition can occur when (i) the Web Service 240 is down, (ii) the Web Service 240 is up but returns a fault because some element that it depends upon has failed, or (iii) the quality of Service is poor (e.g., the Web Service 240 does not respond within a predetermined amount of time. When such a fault condition occurs, the availability cache 232 is used according to a technique 320 illustrated in FIG. 3B.

In the technique 350, the client requests information from the server process (Block 352). The server process routes the request to the Web Service, but a fault condition occurs (Block 354). The server process determines that the fault condition has occurred (Block 326) and instead obtains information related to the request from the availability cache (Block 358). Finally, the server process routes the retrieved information to the client, which initiated the request, so that the client application can use the retrieved information during operation (Block 360).

Figure 2B:
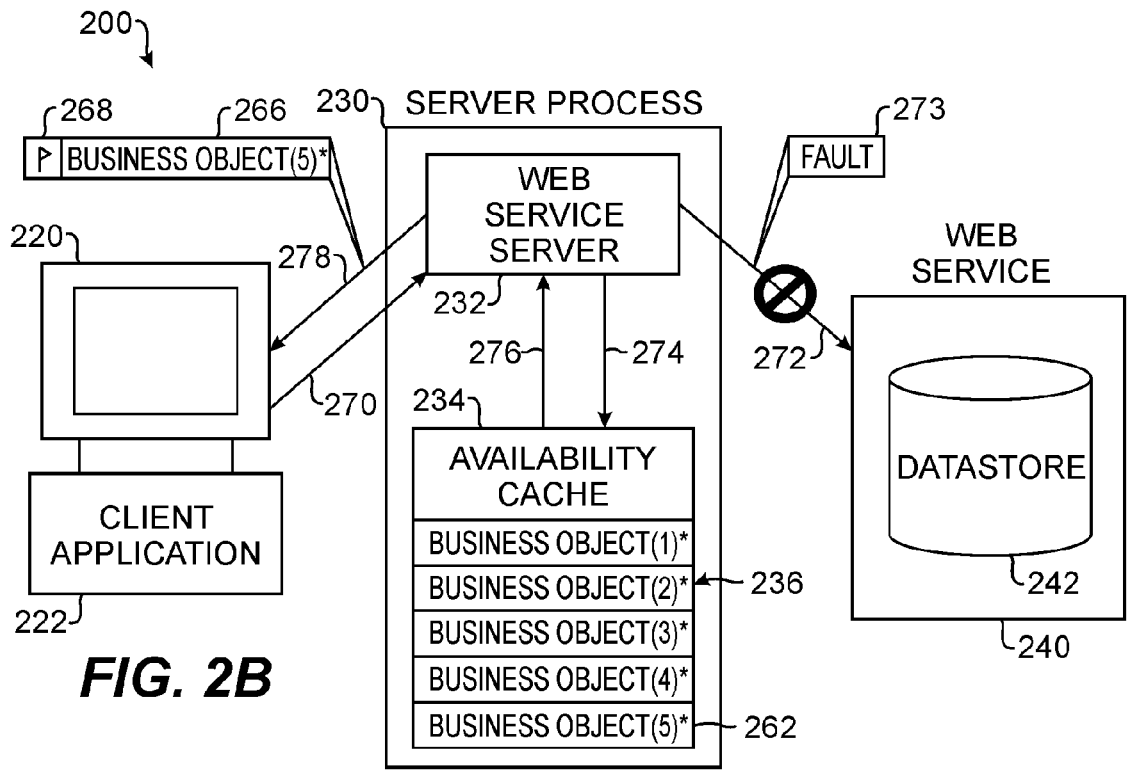
FIG. 2B illustrates an embodiment of the client, the server process, and the Web Service in a second mode of operation where a fault condition occurs.
Figure 3B:
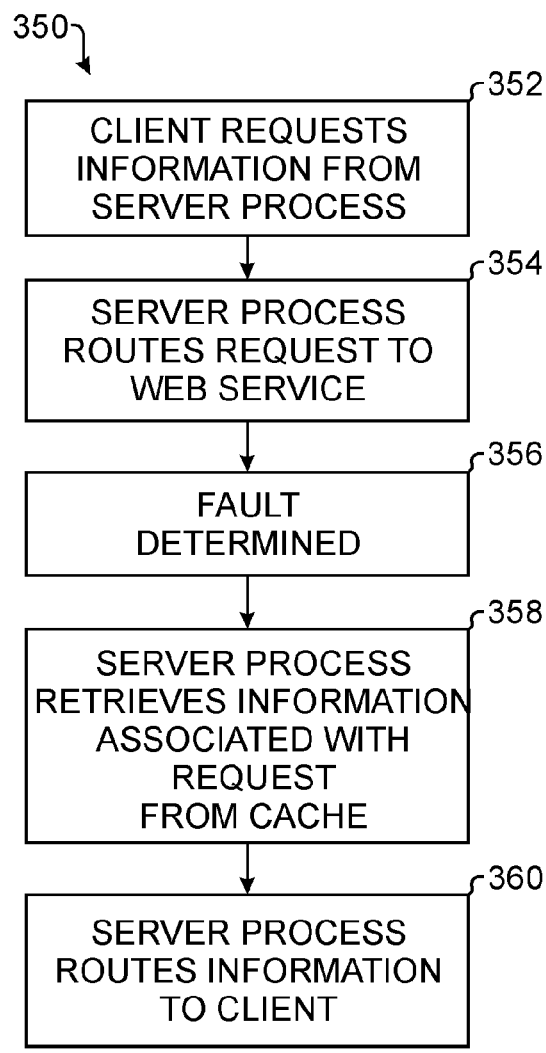
FIG. 3B is a flow chart illustrating a technique for handling a Web Service call and obtaining requested information from the Web Services availability cache when a fault condition is detected.

Given the above overview of the technique 350 in FIG. 3B, we turn to FIG. 2B to discuss the technique in addition detail. The client 220 requests information with a data retrieval operation 270 to the Web Service server 232. The Web Service server 232 sends a message or makes a call 272 to the Web Service 240, but a fault condition 273 occurs because the Web Service 240 is not available or cannot process the request. Techniques known in the art can be used to determine the occurrence of the fault condition 273. In one technique, the Web Service server 232 can use a time-out mechanism. If a response to the call 272 is not received in a predetermined amount of time, then the Web Service server 232 determines that the fault condition 273 has occurred. Alternatively, the client application 222 can use such a time-out mechanism. If a response to the invocation 270 is not received in a predetermined amount of time, then the client application 222 determines that the fault condition 273 has occurred. Then, the client application 222 asks the server process 230 for data from the availability cache 234.

After determination of the fault condition 273 by any of the above techniques, the Web Service server 232 makes a data retrieval operation 274 to the availability cache 234 for information related with the original request. The availability cache 234 processes the data retrieval operation 274 by retrieving the entry 262 in the cache 234 related to the original request and sending the retrieved information from the entry 262 in a response 276 to the Web Service server 232. As previously noted, the entry 262 represents the last updated information from the Web Service 240 related to the original request. The Web Service server 232 then returns a response 278 with the retrieved information 266 to the client application 222. Regardless of whether the fault condition 273 has occurs or not, processing of the initial request by the server process 230 is preferably transparent to the client 220.

For the benefit of the client 220 and client application 222, the retrieved information 266 can include additional information 268, such as a flag indicating that the returned information 266 is from the availability cache 234 and is not directly from the Web Service 240. Thus, the flag of the additional information 268 indicates that the retrieved information 266 represents the last-best information for the original data retrieval operation 270. The additional information 268 can also include a time stamp associated with the retrieved information 266 where the time stamp represents the age of the information 266 or indicates to what extent this information 266 from the cache 234 represents the best or most recently available from the Web Service 240. Thus, the additional information 268 can be used by the client application 222 in situations where the information initially requested from the Web Service 240 changes dynamically.

Figure 2C:
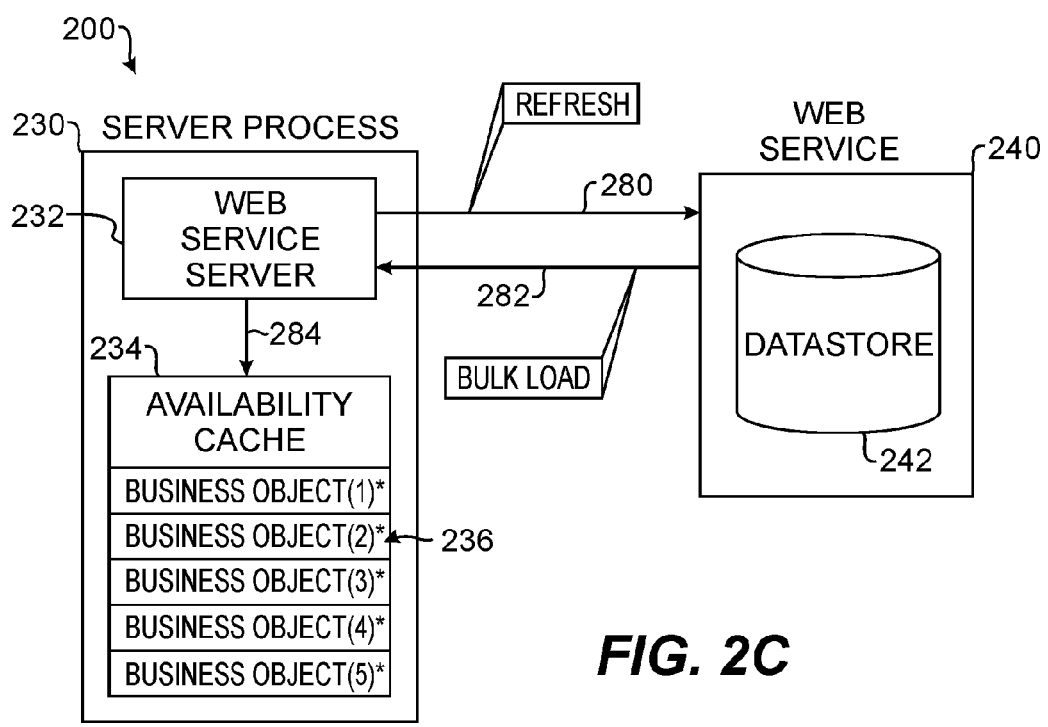
FIG. 2C illustrates an embodiment of the client, the server process, and the Web Service where the Web Services availability cache is populated by a refresh or bulk load operation.

In the previous technique, the availability cache 234 is populated based on requests handled by the server process 230. Another technique for populating the availability cache 234 is shown in FIG. 2C. Rather than populating the availability cache 234 in response to each request handled by the server process 230 as in the embodiment of FIG. 2A, the availability cache 234 is populated by a refresh operation or a bulk load or initialization in the technique of FIG. 2C. In this embodiment, the availability cache 234 is available in a failover manner when "normal" connection to the Web Service 240 is unavailable or when the Web Service 240 is unable to produce results for a given invocation due to other reasons. Periodically, the Web Service server 232 is configured to perform a bulk initialization or refresh of the information stored in the availability cache 234. Several techniques can be used to insert data into the cache 234. For example, the bulk load operation can insert data from the Web Service 240. However, the bulk load operation does not necessarily require the Web Service 240 to input data into the cache 234.

In one embodiment of performing a bulk load or initialization of the cache 234, the server process 230 has a controller (not shown), which can be part of the Web Service server 232. The controller is configured to query the Web Service 240 automatically as a backend datasource and to receive information. For the bulk load or initialization, the controller schedules periodic data retrievals from multiples data sources based upon definitions of Web Services loaded into controller. The controller then stores the received information in the availability cache 234, thereby initializing the cache 234. The controller can collect the information over a period of time so that the cache 234 can store a history of information from the Web Service 240. For example, the controller can be configured to collect information automatically between end points and based on a frequency. Details of such a controller are discussed below with reference to the embodiment of FIG. 6.

In one embodiment of performing a refresh operation, the Web Service server 232 configures a plurality of calls 280 to the Web Service 240, where the calls 280 are based directly on the entries 236 already populating the availability cache 234. In response to the calls 280, the Web server 240 returns responses 282 to the Web Service server 232, which in turn performs cache write operations 284 to the availability cache 234 to store the updated information in the entries 236.

The techniques for populating the availability cache 234 discussed above with reference to FIGS. 2A and 2C are preferably based on knowledge of the kind or type of information in the entries 236 stored in the cache 232 and the respective use pattern of that information. For information that is fairly dynamic (i.e., where the data is changing relatively frequently) but where there are multiple requests for the same information 236, the technique of FIG. 2A associated with populating the availability cache 234 based on requests for information is preferably used. In cases where the information 236 is relatively static (i.e., invariant), the refresh or bulk initialization techniques of FIG. 2C are preferably used.

Figure 4A:
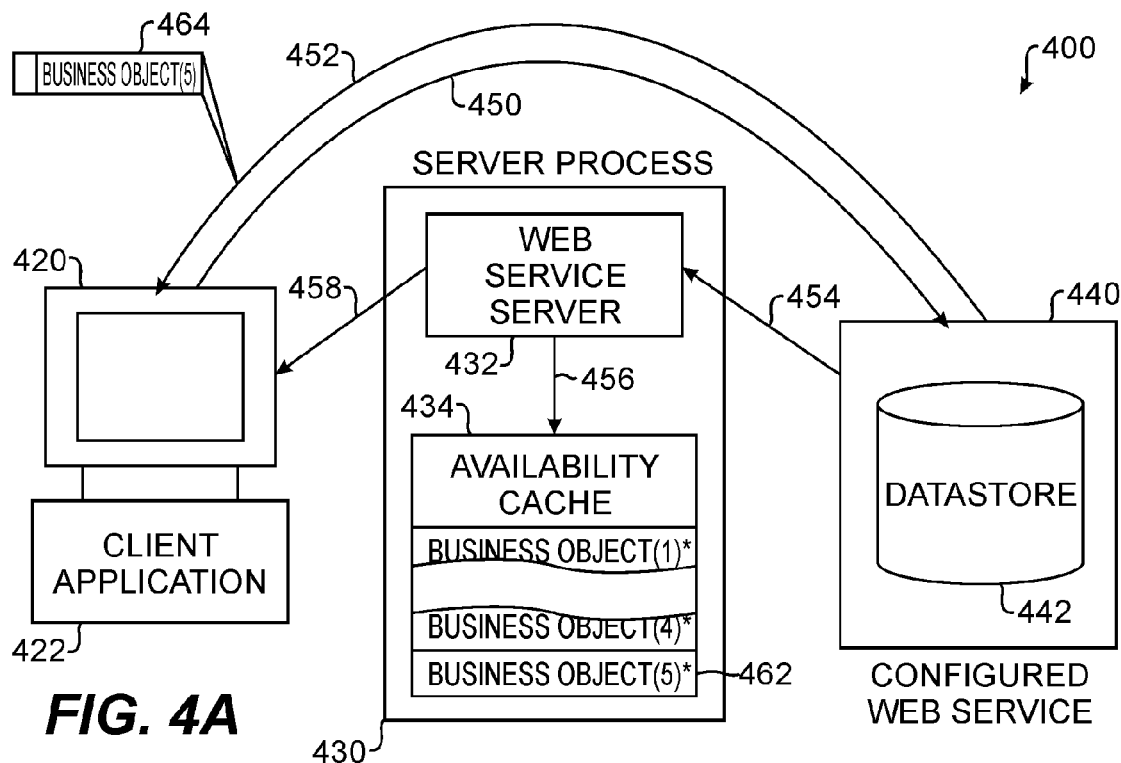
FIG. 4A illustrates another embodiment of a client, a server process, and a Web Service in a first mode of operation where a Web Services availability cache is populated.
Figure 4B:
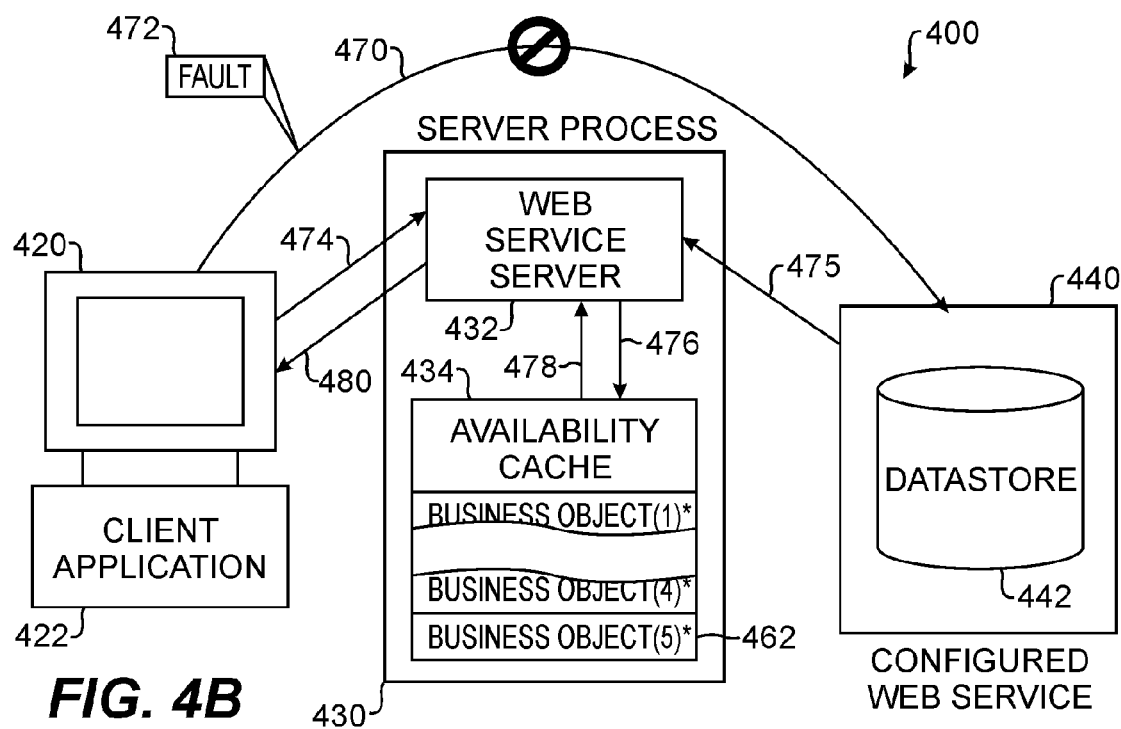
FIG. 4B illustrates an embodiment of the client, the server process, and the Web Service of FIG. 4A in a second mode of operation where a fault condition occurs.

Referring to FIG. 4A, portion of a computer system 400 having a client 420 and a server process 430 is illustrated. As with previous embodiments, the client 420 has a client application 422, and the server process 430 has a Web Service server 432 and an availability cache 434. In the present embodiment, a Web Service 440 is configured to operate in conjunction with the computer system 400. For example, the configured Web Service 440 can be part of the computer system 400 and can be communicatively connectable to the Service process 430 via a network, such as the Internet or a business organization's intranet. Alternatively, the configured Web Service 440 can be an independent Web Service remotely hosted from the computer system 400 but configured to operate in conjunction with the system 400. Before discussing the present embodiment in more detail, we first turn to FIG. 5A, which is a flow chart illustrating a technique 500 for handling a Web Service call and populating the Web Services availability cache when the Web Service is configured to operate in conjunction with the computer system.

Figure 5A:
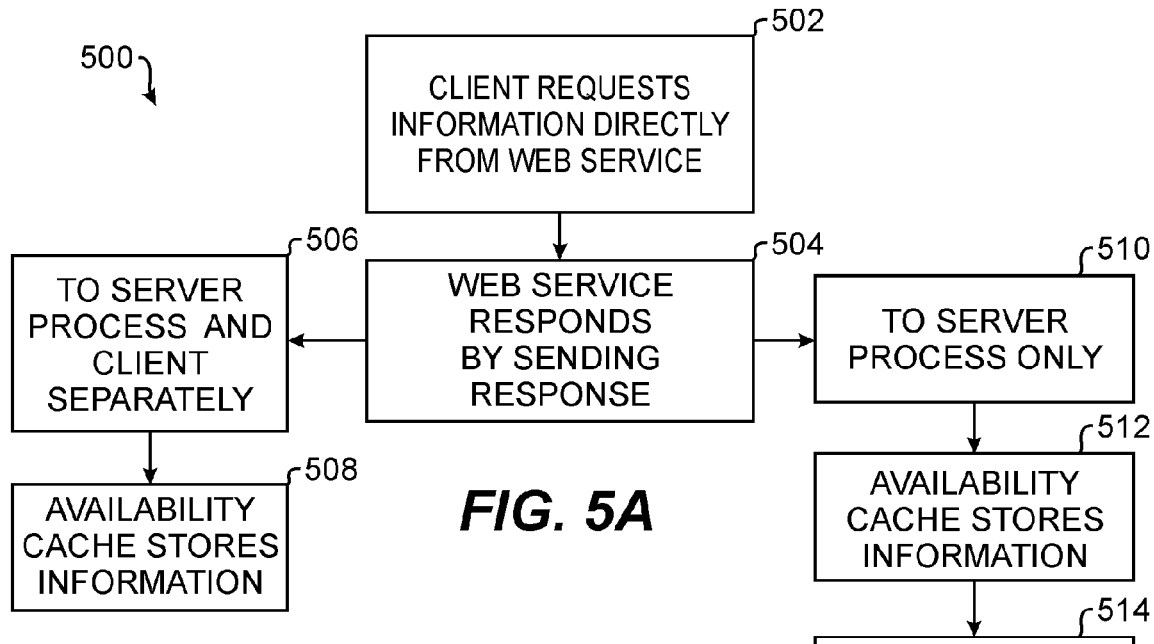
FIG. 5A is a flow chart illustrating another technique for handling a Web Service call and populating a Web Services availability cache.

In the technique 500 of FIG. 5A, the client requests information from the configured Web Service directly (i.e., without routing the request through the server process associated with the availability cache) (Block 502). To request information from the Web Service directly, the client can use another server that is not associated with the availability cache. When called, the Web Service responds to the request by returning a response (Block 504). In one option, the Web Service is configured to send the response separately to the client and to the server process associated with availability cache (Block 506). The client can then use the returned information, while the information is independently stored in the availability cache (Block 508). In another option, the Web Service sends the information to the server process only (Block 510). In response, the server process stores the information in the availability cache (Block 512) and routes the information to the client, which can then use the information during operation a client application (Block 514).

Given the above overview of the technique 500 in FIG. 5A, we now return to FIG. 4A to discuss the technique in addition detail. The client 420 requests information by making a request 450 directly to a configured Web Service 440. To request the configured Web Service 440 directly, the client 420 can use a server (not shown) other than the server 432 associated with the availability cache 434. This other server (not shown) can be part of the computer system 400 or communicatively connectable to the computer system 400 via a network connection. In response to the request 450, the configured Web Service 440 obtains the requested information from its datastore 442 and returns a response 452 having the requested information 464 to the client 420. Thus, this technique may not populate the availability cache 432 based on the requests for information made to the Web Service 440. In this situation, the availability cache 432 can instead be populated with information using the refresh or bulk initialization techniques described previously with reference to FIG. 2C.

In another arrangement, however, the Web Service 440 can be configured to send a response 454 to the Web Service server 432 associated with the availability cache 434 in addition to the response 452 returned to the client 420. When the second response 454 is received, the Web Service server 432 makes a cache write operation 456 with the received information to the availability cache 434, which store the received information in an entry 462. In this technique, the client 420 receives a direct response 452 with requested information 464 from the configured Web Service 440, and the availability cache 434 is separately populated with the entry 462 of the requested information so that it can be accessed later in the event network communication with the configured Web Service 440 is compromised.

In yet another arrangement, the configured Web Service 440 can be configured to send the response 454 to the Web Service server 432 associated with the availability cache 434 instead of sending a response 452 to the client 420. In this technique, the client 420 does not receive a direct response with requested information from the configured Web Services 440. Instead, the configured Web Service 440 sends the response 454 only to the Web Service server 432. In turn, the Web Service server 432 makes a cache write operation 456 to store the requested information in the entry 462 in the availability cache 434 and sends a response 458 with the requested information to the client 420 for use by the client application 422 during operation. Thus, this technique allows the availability cache 434 to be populated based on requests for information from the configured Web Service 440 even though the server process 430 associated with the availability cache 434 did not handle the initial request.

With the availability cache 434 populated as described above, the availability cache 434 can be used when the availability of the configured Web Service 440 is compromised (i.e., a fault condition occurs). For example, the availability cache 434 is used according to a technique 550 illustrated in FIG. 5B when a fault condition occurs. In this technique 550 of FIG. 5B, the client requests information from the configured Web Service directly (Block 552), but a fault condition occurs (Block 554). In response to the fault condition, the client sends a request for the information to the server process associated with the availability cache (Block 556). The availability cache retrieves the information associated with the request, and a response is returned to the client (Block 558).

Figure 5B:
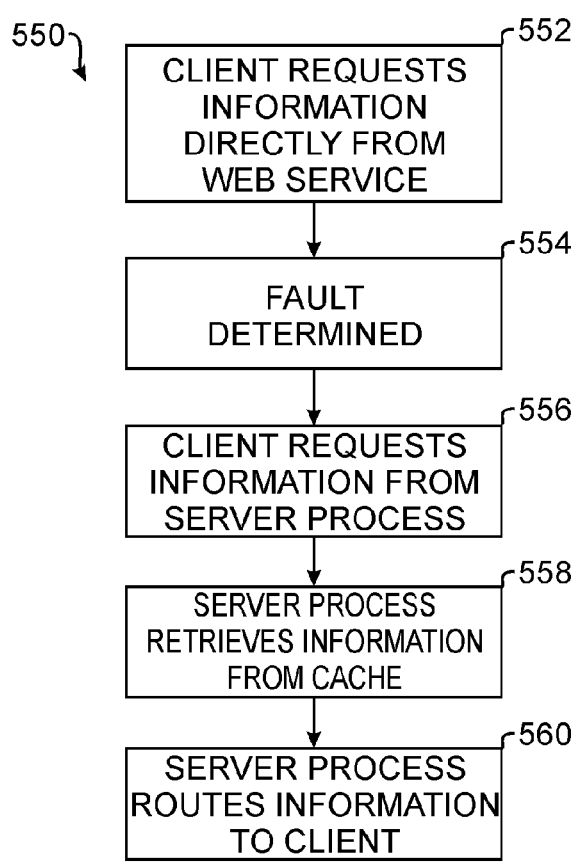
FIG. 5B is a flow chart illustrating another technique for handling a Web Service call and obtaining requested information from the Web Services availability cache when a fault condition occurs.

Given the above overview of the technique 550 in FIG. 5B, we now return to FIG. 4B to discuss the technique in addition detail. The client 420 requests information with a request 470 directly to the configured Web Service 440. Again, the request 470 may be routed using a server (not shown). However, a fault condition 472 occurs because the configured Web Service 440 is not available or unable to process the request in a timely manner. In one option, the client 420 determines the fault condition 472 and makes a data retrieval operation 474 to the Web Service server 432 in response to the fault condition 472. This may be the situation where the configured Web Service 440 is unavailable and does not receive the initial request 470. For this option, the client 420 is specifically configured to make the data retrieval operation 474 to the server process 430 associated with the availability cache 434 in response to the fault condition 472 from another server attempting to get data from the Web Service 440.

In another option, the configured Web Service 440 may receive the request 470, but the fault condition 472 may occur because the configured Web Service 440 is unable to process the call 470 and/or retrieve the requested information. In this situation, the configured Web Service 440 can route the initial request 470 as a data retrieval operation 475 to the Web Service server 432 associated with the availability cache 434. To accomplish this, the Web Service 440 is configured to operate in conjunction with the designated Web Service server 432 associated with the availability cache 434 and is capable of converting the original request 470 into a data retrieval operation 475 for information that the Web Service server 432 is capable of processing.

In either of the above options, the Web Service server 432 then makes a data retrieval operation 476 to the availability cache 434 for information in response to either the data retrieval operation 474 from the client application 422 or the data retrieval operation 475 from the configured Web Service 440. The availability cache 434 processes the server's invocation 476, and the Web Service server 432 obtains retrieved information in a response 478, which represents the last updated information from the Web Service 440 related to the original request. The Web Service server 432 then returns a response 480 with the retrieved information to the client 420 for use by the client application 422 during operation.

Figure 6:
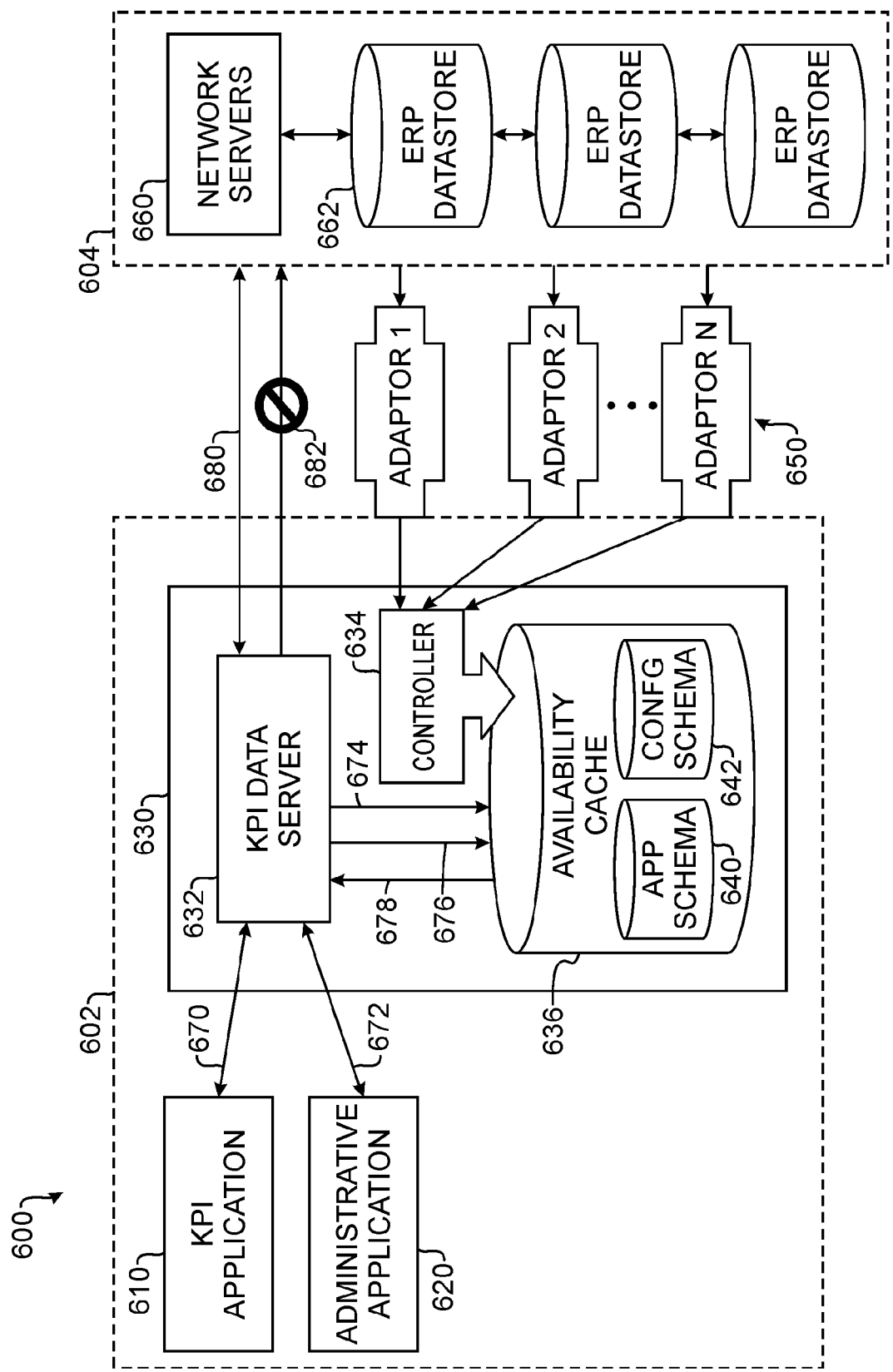
FIG. 6 illustrates an enterprise system having a Key Performance Indicator data server and an availability cache relative to a plurality of remote network servers of an enterprise system.

As previously noted, the teachings of the present disclosure can be applied to an enterprise system responsible for monitoring and controlling a plurality of components and processes of a computer infrastructure. Referring to FIG. 6, an embodiment of an enterprise system 600 having a Key Performance Indicator (KPI) data Service 630 is illustrated relative to a plurality of network servers 660. In this embodiment, the network servers 660 are a remote part 604 of the enterprise system 600 connected to a local part 602 via an enterprise network connection. Communication with the remote network servers 660 can be interrupted for any number of reasons.

The local portion 602 of the enterprise system 600 includes enterprise applications, such as a Key Performance Indicator (KPI) application 610 and an administrative application 620. The KPI application 610 is capable of monitoring the key performance indicators of the enterprise system 600, and the administrative application 620 is capable of performing administrative tasks for the enterprise system 600. In one embodiment, the KPI application 610 is a Key Performance Indicator Portlet, and the administrative application 620 is an Administrative Portlet, both of which are part of BMC Portlets software product available from the assignee of the present disclosure.

In the present embodiment, the KPI data Service 630 includes a controller 634 for collecting data automatically from a plurality of Enterprise Resource Planning (ERP) datastores 664 of the remote servers 662. Typically, adaptors 650, which are known in the art, are used to communicate the data from the datastores 664 to the controller 634. In the context of key performance indicators, the controller 634 is configured to collect data automatically over a period of time and store that collected data in the availability cache 636, which acts as a KPI database. Thus, the automated collection of KPI data by the controller 634 is used to initialize the availability cache 636 in a bulk initialization operation. In addition, the controller 634 can be used to periodically refresh or populate the availability cache 636 where the refreshing can be based on a schedule or other criteria.

In the present embodiment, the availability cache 636 has a first data structure 640 having an application schema of the enterprise system 600. The application schema in this data structure 640 is used by the KPI application 610. In addition, the availability cache 636 has a second data structure 642 having a configuration schema of the enterprise system 600. The configuration schema in this data structure 642 is used by the administrative application 620.

During one form of operation, the applications 610 and 620 make data retrieval operations 670 and 672 requesting KPI data from the KPI data Service 630. The KPI data server 632 directly makes a request 674 for the data to the availability cache 636 and receives a response 678 with the requested KPI data retrieved from the availability cache 636. The retrieved KPI data is then returned to the requesting application 610 and 620.

During another form of operation, the applications 610 and 620 make data retrieval operations 670 and 672 requesting KPI data from the KPI data Service 630. The KPI data server 632 directly makes a request 680 for the requested data to the remote network servers 662. If connection of the network servers 662 is available and the servers 662 are capable of obtaining the requested KPI data from the ERP datastores 664, then the network servers 662 return the requested KPI data to the KPI data server 632. Then, the retrieved KPI data is input into the availability cache 636 with a cache write operation 676, and the KPI data server 632 returns the KPI data to the requesting application 610 and 620.

If connection of the network servers 662 is not available or the servers 662 are incapable of obtaining the requested KPI data from the ERP datastores 664, the KPI data server 632 determines that a fault condition 682 occurs. In response to the fault condition 682, the KPI data server 632 makes a request 674 to the availability cache 636 for the most recently collected or stored data associated with the initial request from the application 610 or 620. The KPI data server 632 receives a response 678 with the requested KPI data retrieved from the availability cache 636 and returns the retrieved KPI data to the requesting application 610 or 620.

The foregoing description of preferred and other embodiments is not intended to limit or restrict the scope or applicability of the inventive concepts conceived of by the Applicants. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A Web Services availability method, comprising:
   passively populating an availability cache in a computer system with discrete business objects from a Web Service communicatively connectable to the computer system via a network by storing business objects in the availability cache received in response to client applications in the computer system making client-based requests to the Web Service, the business objects being directly usable by the client applications;
   actively populating the availability cache with business objects from the Web Service by directly requesting business objects from the Web Service with an automated controller associated with the availability cache, wherein directly requesting business objects from the Web Service comprises:
     independently sending controller-based requests with the automated controller to the Web Service independent of any client-based requests from the client applications, the controller-based requests including one or more periodic requests for business objects issued from the automated controller directly to the Web Service,
     receiving controller-based responses at the automated controller from the Web Service, at least some of the controller-based responses being in response to the one or more periodic requests, and
     storing business objects from the controller-based responses in the availability cache with the automated controller;
   routing a new client-based request from one of the client applications in the computer system to the Web Service; and
   responding to the new client-based request with one of the stored business objects from the availability cache if the Web Service fails to respond to the new client-based request, otherwise responding to the new client-based request with a new business object received from the Web Service in response to the new client-based request.

2. The method of claim 1, wherein the act of responding comprises replacing the stored business object in the availability cache related to the new client-based request with the new business object received from the Web Service in response to the new client-based request.

3. The method of claim 1, wherein the act of responding further comprises identifying the stored business object returned to the client application from the availability cache as coming from the availability cache.

4. The method of claim 1, wherein the act of responding comprises determining that the Web Service is unavailable to respond to the new client-based request from the client application.

5. The method of claim 4, wherein the act of determining that the Web Service is unavailable comprises determining that more than a specified time interval has elapsed since the act of routing the new client-based request from the client application to the Web Service.

6. A computer system, comprising:
   one or more client applications executing on a client computer system; and
   a server application executing on a server computer system communicatively coupled to the client computer system and to a Web Service, the server application configured to
     store discrete business objects directly useable by the client application in an availability cache resulting from the one or more client applications making client-based requests to the Web Service to passively populate the availability cache with business objects from the Web Service;

an automated controller executing on the server computer system, the automated controller associated with the availability cache and directly requesting business objects from the Web Service to actively populate the availability cache with business objects from the Web Service, wherein to directly request business objects from the Web Service, the automated controller is configured to:
  independently send controller-based requests with the automated controller to the Web Service independent of any client-based requests from the client applications, the controller-based requests including one or more periodic requests for business objects issued from the automated controller directly to the Web Service,
  receive controller-based responses at the automated controller from the Web Service, at least some of the controller based-responses being in response to the one or more periodic requests, and
  store business objects from the controller-based responses in the availability cache with the automated controller;
wherein the server application is configured to
  route a new client-based request from one of the client applications to the Web Service, and
  respond to the new client-based request with one of the stored business objects from the availability cache if the Web Service fails to respond to the routed new client-based request, otherwise respond to the client application request with a new business object received from the Web Service in response to the routed new client-based request.

7. The computer system of claim 6, wherein the client computer system comprises a first computer system, the Web Service is provided by a second computer system, and the server computer system comprises a third computer system.

8. The computer system of claim 6, wherein the client computer system and the server computer system comprise a first computer system and the Web Service is provided by a second computer system.

9. The computer system of claim 6, wherein the server computer system is communicatively coupled to the Web Service through one or more computer networks.

10. The computer system of claim 6, wherein to respond, the server application is configured to replace the stored business object in the availability cache related to the new client-based request with the new business object received from the Web Service in response to the new client-based request.

11. The computer system of claim 6, wherein to respond, the server application is further configured to identify the stored business object returned from the availability cache as coming from the availability cache.

12. The computer system of claim 6, wherein to respond, the server application is configured to determine that the Web Service is unavailable to respond to the new client-based request from the client application.

13. The computer system of claim 12, wherein to determine that the Web Service is unavailable, the server application is configured to determine that more than a specified time interval has elapsed since routing the new client-based request from the client application to the Web Service.

14. A Web Services availability method, comprising:
  receiving a plurality of client-based requests for discrete business objects from one or more client applications, the business objects being directly usable by the one or more client applications, the client-based requests directed to a Web Service;
  routing the client-based requests for business objects to the Web Service;
  receiving business objects from the Web Service in response to at least some of the routed client-based requests;
  passively populating an availability cache with the business objects received from the Web Service in response to the routed client-based requests;
  actively populating the availability cache with business objects by directly requesting business objects from the Web Service with an automated controller associated with the availability cache, wherein directly requesting business objects from the Web Service comprises:
    independently sending controller-based requests with the automated controller to the Web Service independent of any of the client-based requests from client applications, the controller-based requests including one or more periodic requests for business objects issued from the automated controller directly to the Web Service,
    receiving controller-based responses at the automated controller from the Web Service, at least some of the controller based-responses being in response to the one or more periodic requests, and
    storing business objects from the controller-based responses in the availability cache with the automated controller; and
  returning, to the client application, one of the stored business objects from the availability cache in response to a specific client-based request only if a new business object from the Web Service is not received in response to the specific client-based request.

15. The method of claim 14, wherein the business objects received from the one or more periodic requests replace the business objects already stored in the availability cache.

16. The method of claim 14, wherein the act of returning further comprises identifying the stored business objects returned from the availability cache as coming from the availability cache.

17. The method of claim 14, wherein the act of returning comprises determining that the Web Service is unavailable to respond to the specific request from the client application.

18. The method of claim 17, wherein the act of determining that the Web Service is unavailable comprises determining that more than a specified time interval has elapsed since the act of routing the request from the client application to the Web Service.

19. A Web Service method, comprising:
  passively populating an availability cache with discrete business objects from a Web Service by storing business objects in the availability cache resulting from one or more client applications making client-based requests to the Web Service, the business object being directly usable by the one or more client applications;
  actively populating the availability cache with business objects by directly requesting business objects from the Web Service with an automated controller associated with the availability cache, wherein directly requesting business objects from the Web Service comprises:
    independently sending controller-based requests with the automated controller to the Web Service independent of any client-based requests from client applications, the controller-based requests including one or more periodic requests for business objects issued from the automated controller directly to the Web Service, receiving controller-based responses at the automated controller from the Web Service, at least some of the controller based-responses being in response to the one or more periodic requests, and storing business objects from the controller-based responses in the availability cache with the automated controller;

receiving a plurality of new client-based requests for business objects from one or more client applications, the new client-based requests directed to the Web Service;

routing the new client-based requests for business objects to the Web Service;

responding to specific client-based requests for business objects from the one or more client applications by returning the stored business objects from the availability cache to the one or more client applications if the Web Service fails to respond to the specific client-based requests, otherwise returning new business objects received from the Web Service in response to the specific client-based requests.

20. The method of claim 19, wherein the act of responding comprises storing in the availability cache the new business objects received from the Web Service in response to the specific client-based requests.

21. The method of claim 19, wherein the business objects received from the one or more periodic requests replace the business objects already stored in the availability cache.

22. The method of claim 19, wherein the act of responding further comprises identifying the stored business objects returned from the availability cache as coming from the availability cache.

23. The method of claim 19, wherein the act of responding comprises determining that the Web Service is unavailable to respond to the specific requests from the client applications.

24. The method of claim 23, wherein the act of determining that the Web Service is unavailable comprises determining that more than a specified time interval has elapsed since the act of routing the specific request to the Web Service.

25. The method of claim 1, wherein the business objects received from the one or more periodic requests replace the business objects already stored in the availability cache.

26. The method of claim 1, wherein the business objects received from the one or more periodic requests are stored as part of a history of the business objects stored in the availability cache.

27. The system of claim 6, wherein the business objects received from the one or more periodic requests replace the business objects already stored in the availability cache.

28. The system of claim 6, wherein the business objects received from the one or more periodic requests are stored as part of a history of the business objects stored in the availability cache.

29. The method of claim 14, wherein the business objects received from the one or more periodic requests are stored as part of a history of the business objects stored in the availability cache.

30. The method of claim 19, wherein the business objects received from the one or more periodic requests are stored as part of a history of the business objects stored in the availability cache.

* * * * *